(12) United States Patent
Maruyama et al.

(10) Patent No.: US 11,577,437 B2
(45) Date of Patent: Feb. 14, 2023

(54) PLASTICIZING DEVICE, INJECTION MOLDING DEVICE, AND THREE-DIMENSIONAL SHAPING DEVICE

(71) Applicant: Seiko Epson Corporation, Tokyo (JP)

(72) Inventors: Hidenobu Maruyama, Azumino (JP); Daichi Miyashita, Matsumoto (JP); Yasuyuki Tanaka, Shiojiri (JP); Kenta Anegawa, Matsumoto (JP); Kenta Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/534,794

(22) Filed: Nov. 24, 2021

(65) Prior Publication Data

US 2022/0168936 A1  Jun. 2, 2022

(30) Foreign Application Priority Data

Nov. 27, 2020  (JP) .............................. JP2020-197295

(51) Int. Cl.
| | |
|---|---|
| *B29C 45/47* | (2006.01) |
| *B29C 64/314* | (2017.01) |
| *B29C 45/58* | (2006.01) |
| *B33Y 30/00* | (2015.01) |

(52) U.S. Cl.
CPC .............. *B29C 45/47* (2013.01); *B29C 45/58* (2013.01); *B29C 64/314* (2017.08); *B33Y 30/00* (2014.12)

(58) Field of Classification Search
CPC ....... B29C 45/72; B29C 64/295; B29C 45/03; B29C 45/42; B33Y 30/00
See application file for complete search history.

(56) References Cited

U.S. PATENT DOCUMENTS

| | | | | |
|---|---|---|---|---|
| 4,390,701 A | * | 6/1983 | Algieri ................. | C07D 307/52 546/235 |
| 2003/0082265 A1 | * | 5/2003 | Bauer .................... | B29C 48/911 425/551 |
| 2010/0320633 A1 | * | 12/2010 | Kamigauchi ......... | B29C 48/276 264/40.6 |
| 2020/0031037 A1 | | 1/2020 | Hideshima | |

FOREIGN PATENT DOCUMENTS

| | | |
|---|---|---|
| JP | 2010-052264 | 3/2010 |
| JP | 2010-241016 | 10/2010 |
| JP | 2020-015219 | 1/2020 |
| WO | 2007-034549 | 3/2007 |

* cited by examiner

*Primary Examiner* — Joseph S Del Sole
*Assistant Examiner* — John Robitaille
(74) *Attorney, Agent, or Firm* — Workman Nydegger

(57) ABSTRACT

A plasticizing device that plasticizes at least a part of a material to generate a plasticized material, the plasticizing device includes: a drive motor; a screw configured to rotate around a rotation axis by a drive force of the drive motor and having a groove forming surface in which a groove is formed; a speed reducer disposed between the drive motor and the screw and configured to transmit the drive force of the drive motor to the screw; a barrel having a facing surface facing the groove forming surface and having a through hole into which the plasticized material flows; a first heater configured to heat the material supplied between the screw and the barrel; a first cooling unit configured to cool the drive motor; and a heat insulating unit disposed between the first cooling unit and the speed reducer. At least a part of the heat insulating unit overlaps the first cooling unit when viewed along the rotation axis of the screw.

12 Claims, 12 Drawing Sheets

PLASTICIZING DEVICE, INJECTION MOLDING DEVICE, AND THREE-DIMENSIONAL SHAPING DEVICE

The present application is based on, and claims priority from JP Application Serial Number 2020-197295, filed Nov. 27, 2020, the disclosure of which is hereby incorporated by reference herein in its entirety.

BACKGROUND

1. Technical Field

The present disclosure relates to a plasticizing device, an injection molding device, and a three-dimensional shaping device.

2. Related Art

JP-A-2020-015219 discloses a plasticizing device that plasticizes a material supplied between a screw and a barrel by rotation of the screw and heating of a heater.

In the plasticizing device as disclosed in JP-A-2020-015219, moisture in the atmosphere may enter the plasticizing device from a gap between components, or moisture contained in the material may evaporate due to heating of the material to generate water vapor in the plasticizing device. In these cases, there is a possibility that dew condensation occurs at a low-temperature portion in the plasticizing device. When dew condensation occurs in the plasticizing device, there is a possibility that rust occurs in the plasticizing device or the material is cooled or moistened by water droplets, such that the material is not sufficiently plasticized.

SUMMARY

According to a first aspect of the present disclosure, a plasticizing device that plasticizes at least a part of a material to generate a plasticized material is provided. The plasticizing device includes: a drive motor; a screw configured to rotate around a rotation axis by a drive force of the drive motor and having a groove forming surface in which a groove is formed; a speed reducer disposed between the drive motor and the screw and configured to transmit the drive force of the drive motor to the screw; a barrel having a facing surface facing the groove forming surface and having a through hole into which the plasticized material flows; a first heater configured to heat the material supplied between the screw and the barrel; a first cooling unit configured to cool the drive motor; and a heat insulating unit disposed between the first cooling unit and the speed reducer. At least a part of the heat insulating unit overlaps the first cooling unit when viewed along the rotation axis of the screw.

According to a second aspect of the present disclosure, an injection molding device is provided. The injection molding device includes: the plasticizing device according to the above aspect; and a nozzle through which the plasticized material flowing out of the through hole is injected into a molding mold.

According to a third aspect of the present disclosure, a three-dimensional shaping device is provided. The three-dimensional shaping device includes: the plasticizing device according to the above aspect; and a nozzle through which the plasticized material flowing out of the through hole is discharged toward a stage.

DESCRIPTION OF EXEMPLARY EMBODIMENTS

A. First Embodiment

Figure 1:
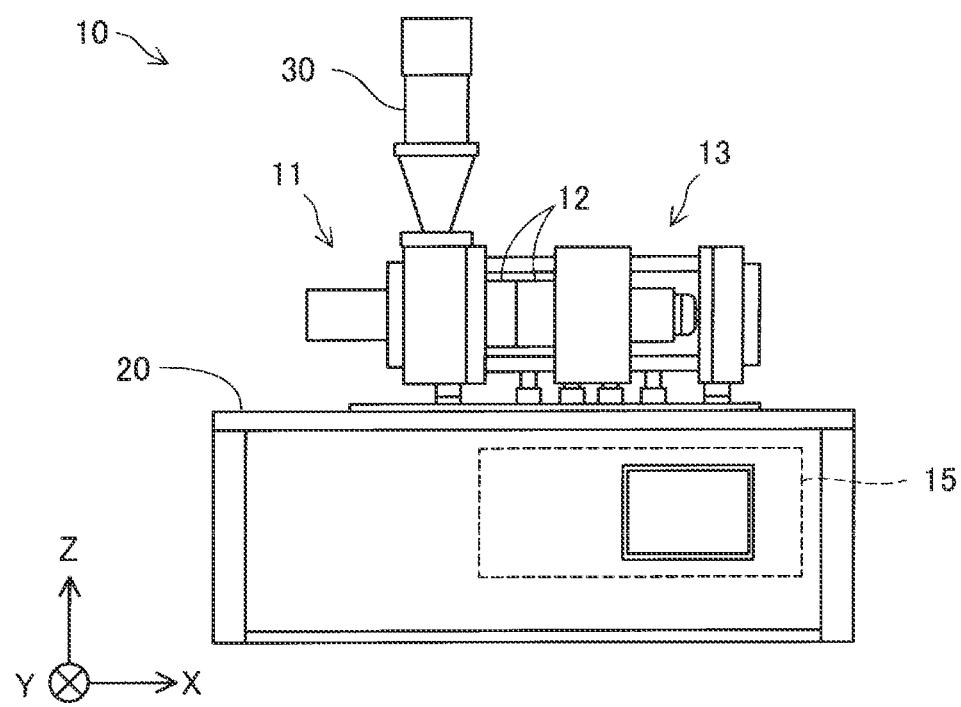
FIG. 1 is a front view showing a schematic configuration of an injection molding device according to a first embodiment.

FIG. 1 is a front view showing a schematic configuration of an injection molding device 10 according to a first embodiment. FIG. 1 shows arrows indicating X, Y, and Z directions that are orthogonal one another. The X direction and the Y direction are directions parallel to a horizontal plane, and the Z direction is a direction opposite to a gravity direction. X, Y, Z directions shown in FIG. 2 and subsequent drawings correspond to the X, Y, Z directions shown in FIG. 1. In the following description, when a direction is specified, "+" indicates a positive direction that is a direction indicated by an arrow, "−" indicates a negative direction that is a direction opposite to the direction indicated by the arrow, and positive and negative symbols are used together to indicate the directions.

The injection molding device 10 includes an injection device 11, a mold clamping device 13, and a control device 15. The injection device 11, the mold clamping device 13, and the control device 15 are fixed to a base 20. The injection molding device 10 injects a plasticized material from the injection device 11 into a molding mold 12 mounted on the mold clamping device 13 to mold a molded product. In the present embodiment, the molding mold 12 made of metal is mounted on the mold clamping device 13. The molding mold 12 mounted on the mold clamping device 13 is not limited to being made of metal, and may be made of resin or ceramic. The molding mold 12 made of metal is referred to as a metal mold.

A hopper 30 into which a material of the molded product is fed is coupled to the injection device 11. As the material of the molded product, for example, a thermoplastic resin formed in a pellet shape is used.

The injection device 11 plasticizes at least a part of the material supplied from the hopper 30 to generate a plasticized material, and injects the plasticized material into the molding mold 12 mounted on the mold clamping device 13. The term "plasticize" means that heat is applied to a material having thermoplasticity to melt the material. The term "melt" means not only that the material having the thermoplasticity is heated to a temperature equal to or higher than a melting point to be a liquid, but also means that, the material having the thermoplasticity is softened by being heated to a temperature equal to or higher than a glass transition point and exhibits fluidity.

The control device 15 is configured with a computer including one or a plurality of processors, a main storage device, and an input and output interface that inputs and outputs signals to and from the outside. When the processor reads and executes a program on the main storage device, the control device 15 controls the injection device 11 and the mold clamping device 13 to manufacture the molded product.

Figure 2:
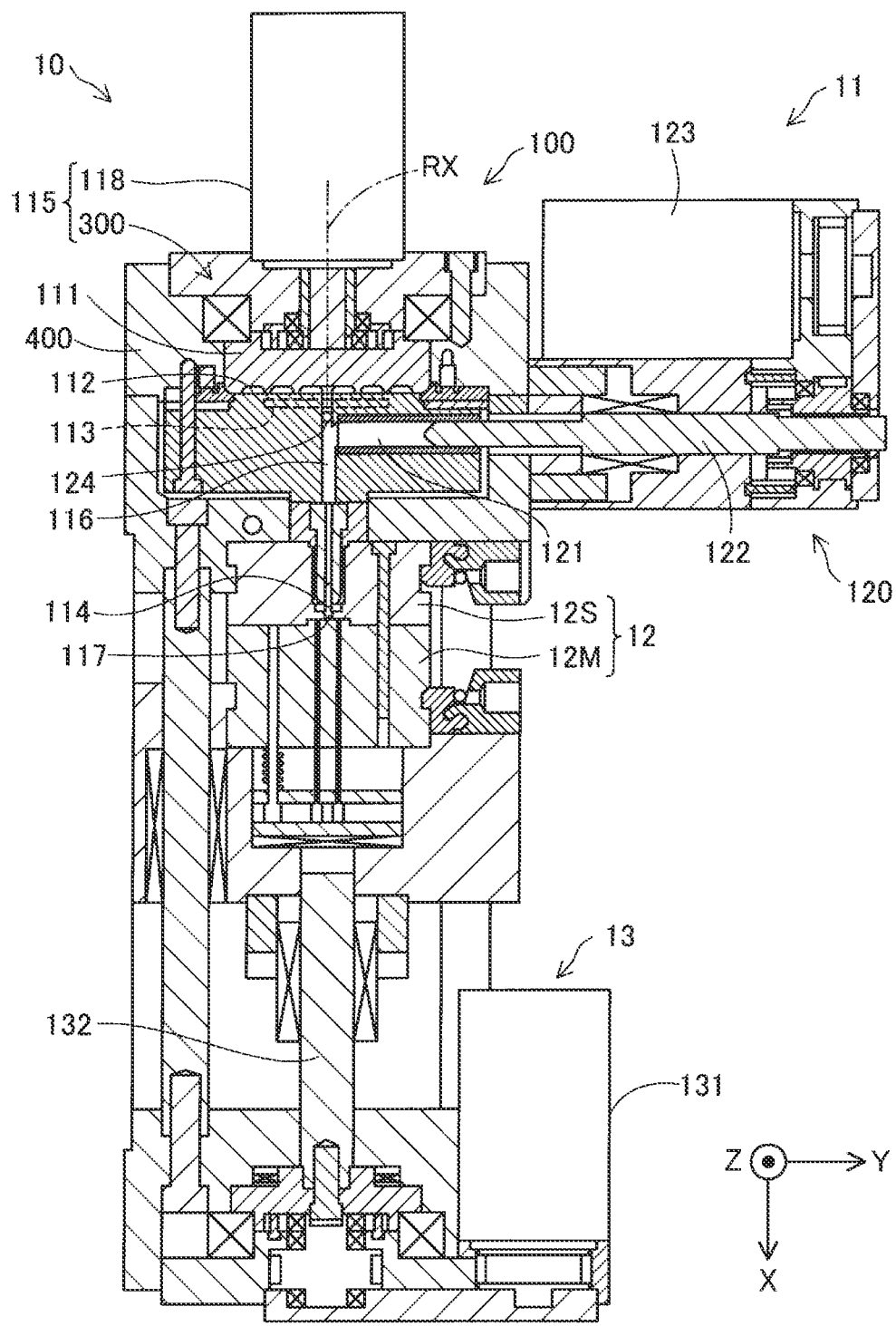
FIG. 2 is a cross-sectional view showing the schematic configuration of the injection molding device according to the first embodiment.

FIG. 2 is a cross-sectional view showing a schematic configuration of the injection molding device 10. As described above, the injection molding device 10 includes the injection device 11 and the mold clamping device 13 on which the molding mold 12 is mounted. The injection device 11 includes a plasticizing device 100, an injection control mechanism 120, and a nozzle 114.

The plasticizing device 100 includes a drive motor 118, a speed reducer 300, a housing unit 400, a flat screw 111, a barrel 112, and a first heater 113. The flat screw 111 may be referred to as a screw or a rotor.

The flat screw 111 is housed in the housing unit 400 that houses the flat screw 111. A specific configuration of the housing unit 400 will be described later. The flat screw 111 is rotationally driven in the housing unit 400 around a rotation axis RX by a screw drive unit 115 including the drive motor 118 and the speed reducer 300. In the present embodiment, the X direction is a direction along the rotation axis RX. A communication hole 116 penetrating the barrel 112 is provided in a central portion of the barrel 112. The communication hole 116 is provided on an extension line of the rotation axis RX. An injection cylinder 121, which will be described later, is coupled to the communication hole 116. The communication hole 116 is provided with a check valve 124 upstream of the injection cylinder 121. The rotation of the flat screw 111 by the screw drive unit 115 and the heating by the first heater 113 are controlled by the control device 15.

Figure 3:
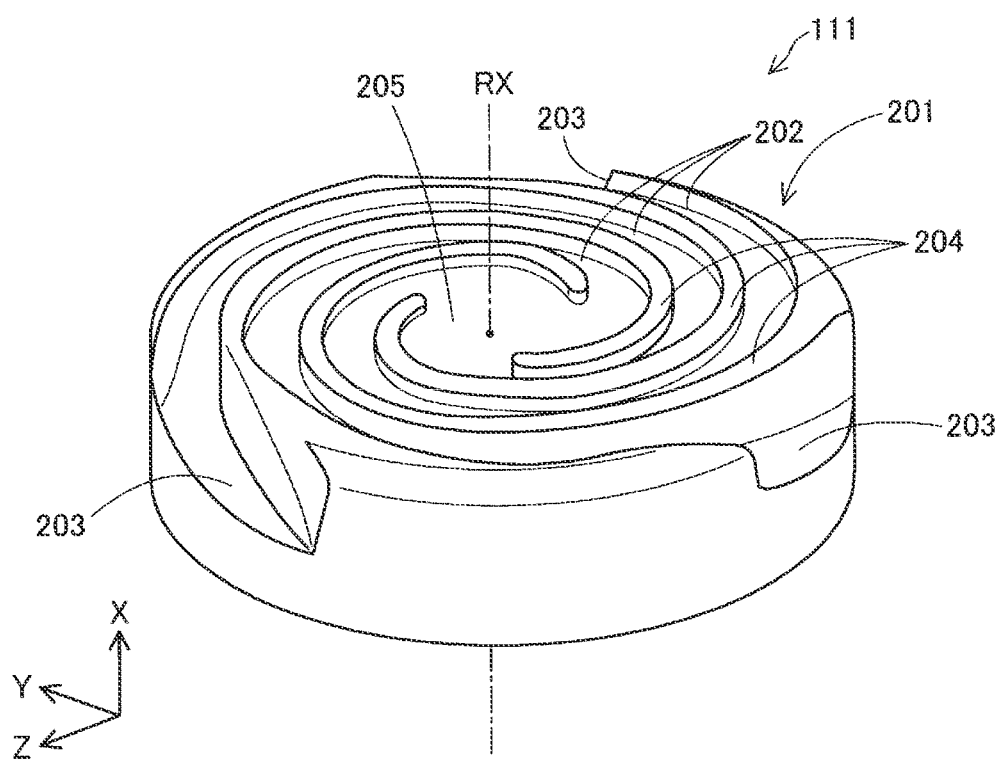
FIG. 3 is a perspective view showing a schematic configuration of a flat screw.

FIG. 3 is a perspective view showing a schematic configuration of the flat screw 111. The flat screw 111 has a substantially cylindrical shape in which a height in a direction along the central axis is smaller than a diameter. On a groove forming surface 201 of the flat screw 111 facing the barrel 112, a spiral groove 202 is formed around a central portion 205. The groove 202 communicates with a material inlet 203 formed in a side surface of the flat screw 111. The material supplied from the hopper 30 is supplied to the groove 202 through the material inlet 203. The groove 202 is formed by being separated by a ridge portion 204. FIG. 3 shows an example in which three grooves 202 are formed, but the number of the grooves 202 may be one, or may be two or more. The shape of the groove 202 is not limited to a spiral shape, and may be a helical shape or an involute curve shape, or may be a shape extending so as to draw an arc from the central portion toward the outer periphery.

Figure 4:
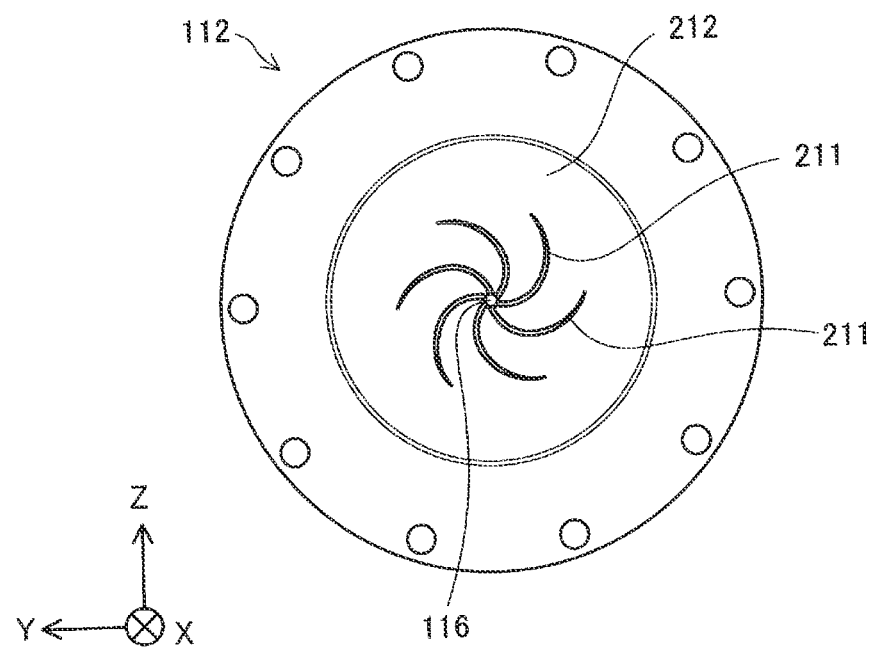
FIG. 4 is a schematic plan view of a barrel.

FIG. 4 is a schematic plan view of the barrel 112. The barrel 112 has a facing surface 212 facing the groove forming surface 201 of the flat screw 111. The communication hole 116 is formed in a center of the facing surface 212. A plurality of guide grooves 211 coupled to the communication hole 116 and extending in a spiral shape from the communication hole 116 toward the outer periphery are formed in the facing surface 212. The material supplied to the groove 202 of the flat screw 111 is plasticized between the flat screw 111 and the barrel 112 by the rotation of the flat screw 111 and the heating of the first heater 113, flows along the groove 202 and the guide groove 211 by the rotation of the flat screw 111, and is guided to the central portion 205 of the flat screw 111. In order to facilitate conveyance of the material between the flat screw 111 and the barrel 112, a temperature of an outer peripheral portion of the flat screw 111 surrounding the central portion 205 is preferably lower than a temperature of the central portion 205 of the flat screw 111. The material that has flowed into the central portion 205 is guided from the communication hole 116 to the injection control mechanism 120. The guide groove 211 may not be provided in the barrel 112.

As shown in FIG. 2, the injection control mechanism 120 includes the injection cylinder 121, a plunger 122, and a plunger drive unit 123. The injection control mechanism 120 has a function of injecting the plasticized material in the injection cylinder 121 into a cavity 117 to be described later. The injection control mechanism 120 controls an injection amount of the plasticized material from the nozzle 114 under the control of the control device 15. The injection cylinder 121 is a substantially cylindrical member coupled to the communication hole 116 of the barrel 112, and includes the plunger 122 therein. The plunger 122 slides inside the injection cylinder 121, and pressure-feeds the plasticized material inside the injection cylinder 121 to the nozzle 114 coupled to the plasticizing device 100. The plunger 122 is driven by the plunger drive unit 123 implemented by a motor.

The molding mold 12 includes a movable mold 12M and a fixed mold 12S. The movable mold 12M and the fixed mold 12S are disposed so as to face each other, and the cavity 117, which is a space corresponding to the shape of the molded product, is provided between the movable mold 12M and the fixed mold 12S. The plasticized material flowing out from the communication hole 116 of the barrel 112 is pressure-fed by the injection control mechanism 120 from the nozzle 114 and filled into the cavity 117.

The mold clamping device 13 includes a molding mold drive unit 131, and has a function of opening and closing the movable mold 12M and the fixed mold 12S. Under the control of the control device 15, the mold clamping device 13 rotates a ball screw 132 by driving the molding mold drive unit 131 implemented by a motor, and moves the movable mold 12M coupled to the ball screw 132 with respect to the fixed mold 12S to open and close the molding mold 12. That is, the fixed mold 12S is stationary in the injection molding device 10, and the movable mold 12M moves relative to the stationary fixed mold 12S, and therefore, the molding mold 12 is opened and closed.

Figure 5:
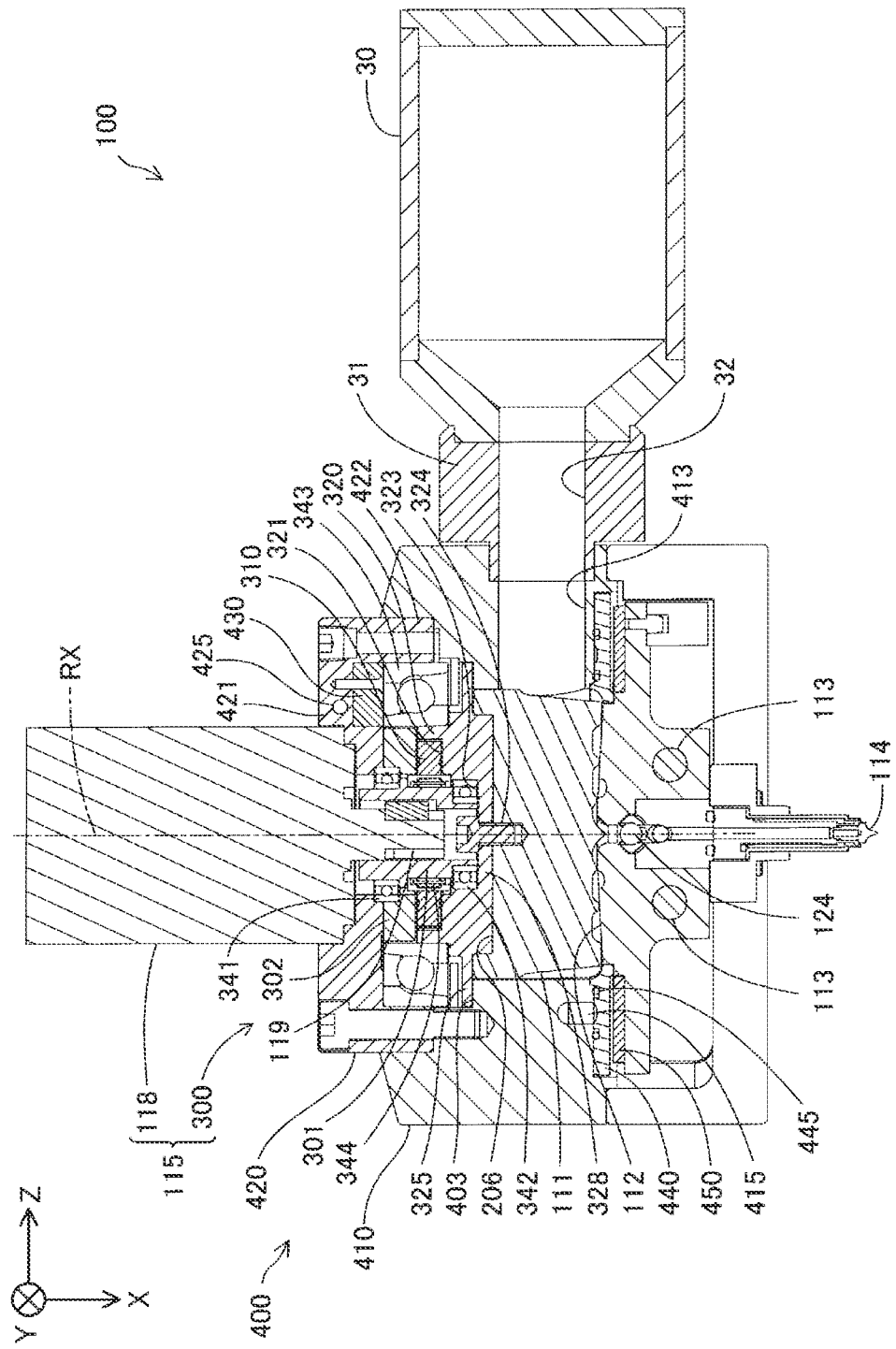
FIG. 5 is a cross-sectional view showing a schematic configuration of a plasticizing device according to the first embodiment.
Figure 6:
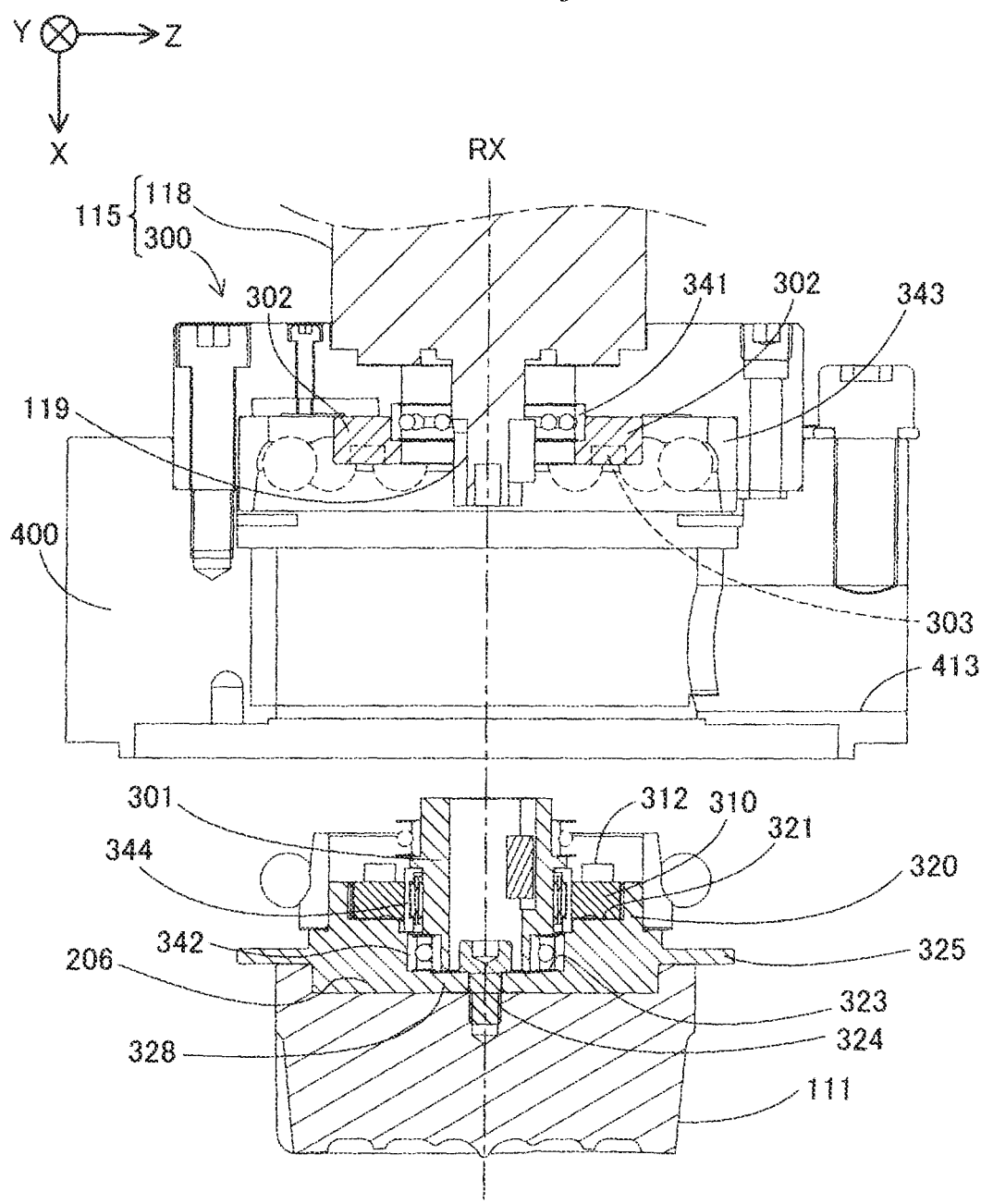
FIG. 6 is an exploded cross-sectional view of a part of a speed reducer.
Figure 7:
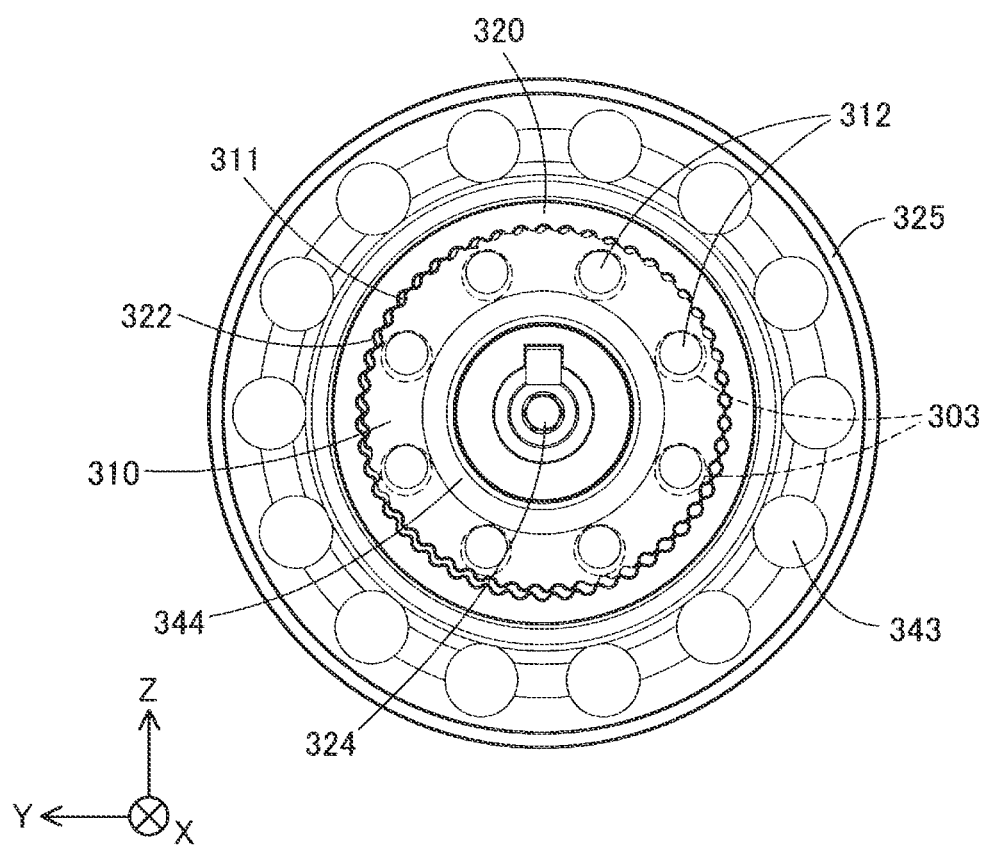
FIG. 7 is a plan view showing a configuration of a first gear and a second gear provided in the speed reducer.
Figure 8:
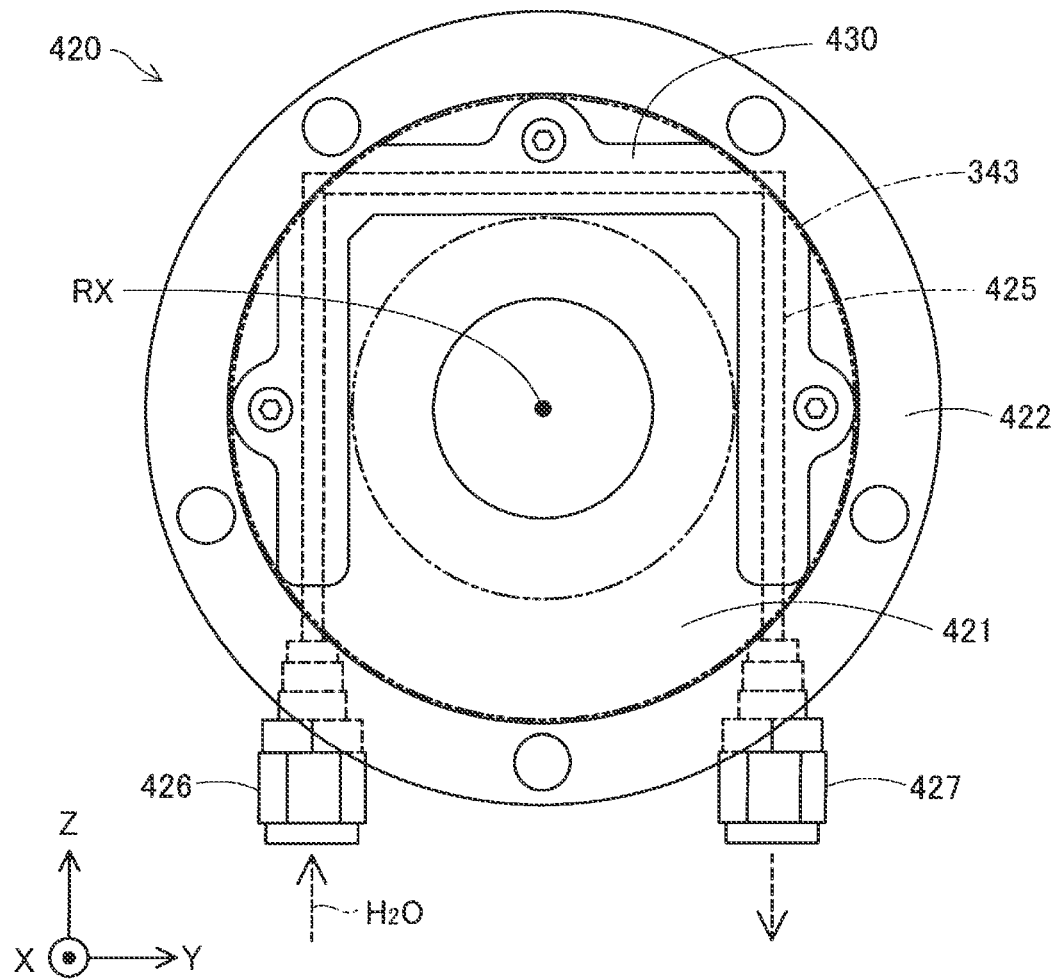
FIG. 8 is a plan view showing a configuration of a first cooling unit and a first heat insulating unit provided in a lid portion.

FIG. 5 is a cross-sectional view showing a schematic configuration of the plasticizing device 100. FIG. 6 is an exploded cross-sectional view of a part of the speed reducer 300. FIG. 7 is a plan view of a first gear 310 and a second gear 320 provided in the speed reducer 300 as viewed in a +X direction. FIG. 8 is a plan view of a lid portion 420 of the housing unit 400 as viewed in a −X direction. In the cross-sectional views shown in FIG. 5 and subsequent figures, hatching in each cross section is omitted as appropriate. The cross section shown in FIG. 5 shows a cross section in a direction different from that of the cross section shown in FIG. 3. As described above, the plasticizing device 100 includes the drive motor 118, the speed reducer 300, the housing unit 400, the flat screw 111, the barrel 112, and the first heater 113.

The speed reducer 300 transmits a rotational drive force of the drive motor 118 to the flat screw 111. The speed reducer 300 in the present embodiment is a speed reducer of a concentric shaft type in which an input shaft and an output shaft are on the same axis. The speed reducer 300 includes a substantially cylindrical eccentric body 301 fixed to an output shaft 119 of the drive motor 118, the first gear 310 configured as a planetary gear, and the second gear 320 configured as a sun internal gear.

An end portion of the eccentric body 301 on the drive motor 118 side is pivotally supported by a first ball bearing 341 fixed to the housing unit 400. An end portion of the eccentric body 301 on the flat screw 111 side is pivotally supported by a second ball bearing 342 press-fitted to an inner periphery of the second gear 320. An outer periphery of a portion of the eccentric body 301 fixed to the first ball bearing 341 and an outer periphery of a portion of the eccentric body 301 fixed to the second ball bearing 342 have a circular shape centered on the output shaft of the drive motor 118. On the other hand, a portion of the eccentric body 301 sandwiched between the first ball bearing 341 and the second ball bearing 342 has a circular shape having a central axis eccentric with respect to the output shaft of the drive motor 118. In the following description, the term "eccentric body 301" simply refers to a portion of the eccentric body 301 sandwiched between the first ball bearing 341 and the second ball bearing 342.

The first gear 310 has an annular shape, and a needle bearing 344 is press-fitted and fixed to an inner peripheral portion of the first gear 310. As shown in FIG. 7, wavy external teeth 311 are formed on the outer periphery of the first gear 310. On the first gear 310, a plurality of pins 312 are disposed at equal intervals in a peripheral direction when viewed in the +X direction. Each of the pins 312 is disposed in a pin receiving recess 303. As shown in FIG. 6, a plurality of the pin receiving recesses 303 are formed in an annular pin receiving portion 302 fixed to the housing unit 400 around the eccentric body 301. As shown in FIG. 7, each of the pin receiving recesses 303 is open toward the +X direction side, and has a diameter larger than a diameter of the pin 312. Therefore, the pin 312 can move in the Y direction and the Z direction which are directions perpendicular to the rotation axis RX in the pin receiving recess 303.

As shown in FIG. 5, the second gear 320 has a bottomed cylindrical shape whose end surface on the −X direction side is open. A first recess 321 is formed in an end surface of the second gear 320 on the −X direction side, and a second recess 323 is further formed in a bottom portion of the first recess 321. The first gear 310 is housed in the first recess 321. Wavy internal teeth 322 with which the external teeth 311 of the first gear 310 shown in FIG. 7 come into contact are formed on an inner periphery of the first recess 321. The second ball bearing 342 that pivotally supports the end portion of the eccentric body 301 on the +X direction side is press-fitted and fixed to the second recess 323.

A recess 206 is formed in an end surface of the flat screw 111 on the −X direction side, and a bottom portion 328 of the second gear 320 is fitted into the recess 206. The recess 206 and the bottom portion 328 are subjected to idling prevention processing such as D-cut processing. The flat screw 111 is fixed to the bottom portion 328 of the second gear 320 by a bolt 324 as a fixing portion in the direction of the rotation axis RX. That is, the flat screw 111 is integrated with the second gear 320. Therefore, when the second gear 320 moves along the rotation axis RX, the flat screw 111 also moves along the rotation axis RX consequently. The second gear 320 and the flat screw 111 may be fixed to each other by other fixing portions such as rivets, not limited to the bolt 324. Further, the number of the bolts 324 is not limited to one, and a plurality of the bolts 324 may be used to fix the second gear 320 and the flat screw 111 to each other.

A flange-shaped first regulating portion 325 is formed on the outer periphery of the second gear 320. The details of the first regulating portion 325 will be described later. A portion of the second gear 320 on the −X direction side with respect to the first regulating portion 325 is pivotally supported by a third ball bearing 343 fixed to the housing unit 400 on the outer peripheral side of the pin receiving portion 302. In the present embodiment, the third ball bearing 343 is configured as a single-row angular bearing that receives a load in the −X direction from the flat screw 111.

An operation of the speed reducer 300 described above will be described. When the drive motor 118 rotates, the eccentric body 301 fixed to the output shaft 119 of the drive motor 118 rotates. The eccentric body 301 partially contacts the needle bearing 344 provided on the inner periphery of the first gear 310 while rotating. When the eccentric body 301 comes into contact with the needle bearing 344, the first gear 310 fixed to the needle bearing 344 receives a drive force from the eccentric body 301, and swings in an X-Y direction (radial direction) intersecting the rotation axis RX in a state where the pin 312 is housed in the pin receiving recess 303. With the movement of the first gear 310, the external teeth 311 of the first gear 310 partially and sequentially come into contact with the internal teeth 322 of the second gear 320, the second gear 320 rotates, and accordingly, the flat screw 111 fixed to the second gear 320 rotates in the housing unit 400. In FIG. 6, a structure of the speed reducer 300 operating in this way is shown in such a manner that a portion fixed to the housing unit 400 and a portion moved by the drive force of the drive motor 118 are separated into upper and lower portions.

As described above, the flange-shaped first regulating portion 325 is formed on the outer periphery of the second gear 320. Since the flat screw 111 is fixed to the second gear 320, it can be said that the first regulating portion 325 is indirectly fixed to the flat screw 111.

The housing unit 400 includes a second regulating portion 403 facing a surface of the first regulating portion 325 on the +X direction side. The first regulating portion 325 is contactable with the second regulating portion 403. The term "contactable" means that either a state of being out of contact or a state of being in contact can be achieved. The movement of the flat screw 111 along the rotation axis RX, more specifically, the movement of a predetermined amount or more in the +X direction is regulated by the first regulating portion 325 and the second regulating portion 403.

The groove forming surface 201 of the flat screw 111 is spaced apart from the facing surface 212 by a predetermined interval in a state where the first regulating portion 325 and the second regulating portion 403 are in contact with each other. This interval is, for example, 0.1 mm. The interval between the groove forming surface 201 and the facing surface 212 refers to the shortest interval at a position where the groove 202 or the guide groove 211 is not formed.

Grease may be applied between the first regulating portion 325 and the second regulating portion 403 in order to reduce sliding resistance therebetween, and further, these surfaces may be subjected to low-friction coating with a fluorine resin or the like. Alternatively, the first regulating portion 325 or the second regulating portion 403 may be formed of a member having a low friction coefficient.

Even when the flat screw 111 moves toward the barrel 112 side along the rotation axis RX, the first regulating portion 325 fixed to the flat screw 111 comes into contact with the second regulating portion 403 before the flat screw 111 comes into contact with the barrel 112. Therefore, for example, even when the material supply from the hopper 30 is temporarily stopped during continuous molding or the like or when a material passage 32 is clogged with the material, the flat screw 111 and the barrel 112 do not come into contact with each other. Therefore, it is possible to prevent the flat screw 111 and the barrel 112 from being worn to reduce durability.

As shown in FIG. 5, the housing unit 400 includes a main body portion 410, the lid portion 420, a first cooling unit 425, a first heat insulating unit 430, a second cooling unit 415, and a second heat insulating unit 450.

The main body portion 410 is configured in a cylindrical shape. The flat screw 111 is disposed inside the main body portion 410. The hopper 30 is coupled to the main body portion 410 via a cylindrical coupling member 31. The main body portion 410 is provided with a material inlet 413 that communicates with the hopper 30. The material inlet 413 is provided so as to penetrate through the main body portion 410 along the Z direction. The material stored in the hopper 30 is supplied to the material inlet 413 via the material passage 32 provided in the coupling member 31. In the present embodiment, the main body portion 410 is made of stainless steel.

The lid portion 420 is disposed so as to close an end portion of the main body portion 410 on the −X direction side. The lid portion 420 is configured in a bottomed cylindrical shape, and includes a disc-shaped bottom surface portion 421 and a cylindrical side surface portion 422 extending in the +X direction from an outer peripheral edge of the bottom surface portion 421. A recess is provided on a surface of the bottom surface portion 421 on the −X direction side, and the drive motor 118 is fixed to the bottom surface portion 421 using the recess as a bearing surface. A through hole through which the output shaft 119 of the drive motor 118 passes is provided in a center of the bottom surface portion 421. The lid portion 420 is fixed to the main body portion 410 by a bolt penetrating the side surface portion 422 along the X direction. In the present embodiment, the lid portion 420 is made of stainless steel.

The first cooling unit 425 is disposed on the outer periphery of the drive motor 118. In the present embodiment, the first cooling unit 425 is formed by a pipe embedded in the bottom surface portion 421 of the lid portion 420. Refrigerant flows through the first cooling unit 425. In the present embodiment, water is used as the refrigerant. As the refrigerant, for example, a coolant or oil may be used instead of water. The drive motor 118 can be cooled by the refrigerant flowing through the first cooling unit 425. Further, it is possible to prevent the heat from the first heater 113 from being transferred to the drive motor 118 by the refrigerant flowing through the first cooling unit 425.

The first heat insulating unit 430 is disposed between the first cooling unit 425 and the speed reducer 300 in the X direction. More specifically, the first heat insulating unit 430 is disposed between the first cooling unit 425 and the third ball bearing 343. A thermal conductivity of the first heat insulating unit 430 is lower than a thermal conductivity of the lid portion 420. In the present embodiment, the first heat insulating unit 430 is formed of a plate-shaped glass epoxy substrate. The first heat insulating unit 430 is not limited to the glass epoxy substrate, and may be formed of, for example, a ceramic material.

As shown in FIG. 8, a refrigerant inlet 426 for introducing the refrigerant into the first cooling unit 425 and a refrigerant outlet 427 for discharging the refrigerant from the first cooling unit 425 are fixed to the lid portion 420. In the present embodiment, the refrigerant inlet 426 and the refrigerant outlet 427 are provided in a portion of the lid portion 420 on a −Z direction side. The refrigerant inlet 426 and the refrigerant outlet 427 are provided at positions different from each other in the Y direction. The first cooling unit 425 is provided in a U shape so as to cover ¾ of the outer periphery of the drive motor 118. The refrigerant is supplied to the refrigerant inlet 426 by, for example, a pump. The refrigerant flowing through the first cooling unit 425 and discharged from the refrigerant outlet 427 is cooled by, for example, a heat exchanger, and then circulates to the pump.

The first heat insulating unit 430 is disposed so as to cover at least a part of the first cooling unit 425 when viewed along the rotation axis RX of the flat screw 111. It is preferable that half or more of the first cooling unit 425 is covered with the first heat insulating unit 430. In the present embodiment, the first heat insulating unit 430 has a shape along the first cooling unit 425 provided in the U shape. The first heat insulating unit 430 covers 90% or more of the first cooling unit 425. A groove-shaped recess corresponding to the shape of the first heat insulating unit 430 is provided in the bottom surface portion 421 of the lid portion 420. A thickness of first heat insulating unit 430 is equal to or less than a depth of the recess. In FIG. 8, the third ball bearing 343 is indicated by a two-dot chain line. The bottom surface portion 421 is provided with the above-described recess so as to secure a bearing surface of the third ball bearing 343, and the first heat insulating unit 430 is fixed to the bottom surface portion 421 by a bolt in a state where the first heat insulating unit 430 is fitted into the recess. The shape of the first heat insulating unit 430 may not be a shape along the first cooling unit 425. For example, the shape of first heat insulating unit 430 may be an annular shape.

As shown in FIG. 5, the second cooling unit 415 is disposed on the outer periphery of the flat screw 111. In the present embodiment, the second cooling unit 415 is formed by an annular groove provided at an end portion of the main body portion 410 on the +X direction side. An annular plate member 440 that covers the second cooling unit 415 is fixed to the end portion of the main body portion 410 on the +X direction side. In the present embodiment, the plate member 440 is made of stainless steel. Two grooves are concentrically provided in a surface of the plate member 440 on the main body portion 410 side, and an O-ring 445 for securing sealing properties between the main body portion 410 and the plate member 440 is disposed in each of the grooves. Refrigerant flows through the second cooling unit 415. In the present embodiment, water is used as the refrigerant. As the refrigerant, for example, a coolant or oil may be used instead of water. The refrigerant is supplied to the second cooling unit 415 by, for example, a pump. The refrigerant flowing through the second cooling unit 415 is cooled by, for example, a heat exchanger, and then circulates to the pump. The outer peripheral portion of the flat screw 111 can be cooled by the refrigerant flowing through the second cooling unit 415.

The second heat insulating unit 450 is disposed between the second cooling unit 415 and the barrel 112 in the X direction. A thermal conductivity of second heat insulating unit 450 is lower than a thermal conductivity of the main body portion 410. In the present embodiment, the second heat insulating unit 450 is formed of a plate-shaped glass epoxy substrate. The second heat insulating unit 450 is not limited to the glass epoxy substrate, and may be formed of, for example, a ceramic material. Since the second cooling unit 415 and the barrel 112 are thermally insulated from each other by the second heat insulating unit 450, it is possible to prevent a temperature of the facing surface 212 of the barrel 112 from becoming too low and the plasticization of the material from becoming insufficient.

According to the injection molding device 10 of the present embodiment described above, since the housing unit 400 of the plasticizing device 100 includes the first heat insulating unit 430 between the first cooling unit 425 and the speed reducer 300, it is possible to reduce a temperature gradient in the housing unit 400 between the first heater 113 and the first heat insulating unit 430. Therefore, it is possible to prevent the occurrence of dew condensation in the housing unit 400. In particular, in the present embodiment, since the first heat insulating unit 430 is provided along a shape of the first cooling unit 425, it is easy to reduce the above-described temperature gradient. Further, since the first heat insulating unit 430 is disposed between the drive motor 118 and the first heater 113 in the housing unit 400, it is possible to effectively prevent the heat from the first heater 113 from being transferred to the drive motor 118.

In the present embodiment, the housing unit 400 includes the second cooling unit 415 disposed on the outer periphery of the flat screw 111. The temperature of the outer peripheral portion of the flat screw 111 can be kept lower than a temperature of a central portion of the flat screw 111. Therefore, it is possible to prevent the material from being hardly conveyed between the flat screw 111 and the barrel 112. Therefore, it is possible to prevent variation in the amount of the plasticized material flowing into the communication hole 116 of the barrel 112.

B. Second Embodiment

Figure 9:
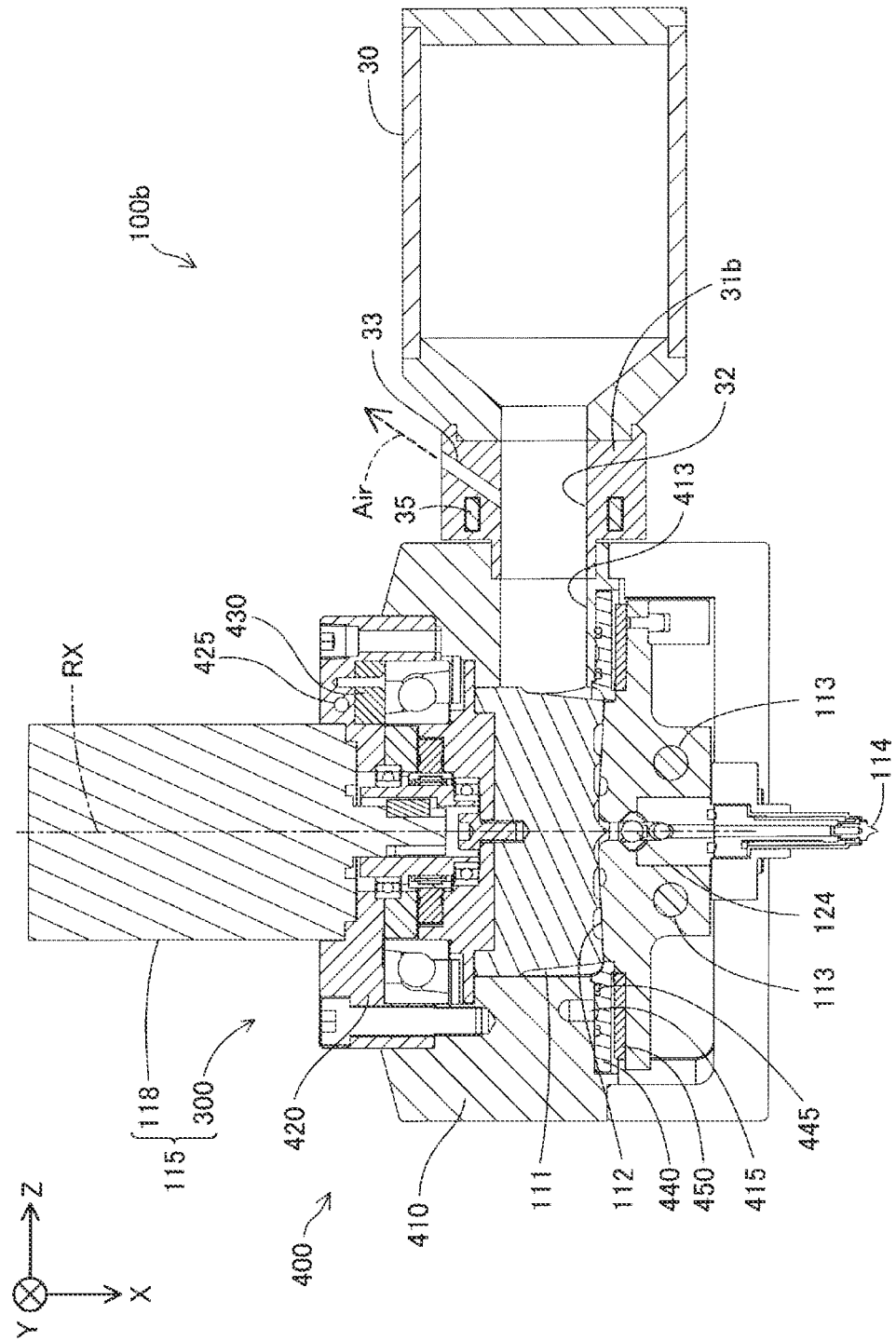
FIG. 9 is a cross-sectional view showing a schematic configuration of a plasticizing device according to a second embodiment.

FIG. 9 is a cross-sectional view showing a schematic configuration of a plasticizing device 100b according to a second embodiment. The plasticizing device 100b of the second embodiment is different from that of the first embodiment in that an exhaust passage 33 is provided in a coupling member 31b that couples the hopper 30 and the housing unit 400. Other configurations are the same as those of the first embodiment unless otherwise specified.

In the present embodiment, the coupling member 31b is provided with the exhaust passage 33 branched from the material passage 32. The exhaust passage 33 extends from the material passage 32 in a direction intersecting a +Z direction and toward the upper side of the horizontal plane. Therefore, it is possible to prevent the material supplied from the hopper 30 from flowing into the exhaust passage 33. In the present embodiment, one exhaust passage 33 is provided in the coupling member 31b. In another embodiment, a plurality of the exhaust passages 33 may be provided in the coupling member 31b. For example, in the coupling member 31b, the plurality of exhaust passages 33 may be disposed side by side along the Z direction, the plurality of exhaust passages 33 may be disposed radially around the material passage 32, or the radial exhaust passages 33 may be disposed in a plurality of rows along the Z direction.

The coupling member 31b is provided with a second heater 35. The second heater 35 heats the exhaust passage 33. A temperature of the second heater 35 is controlled by the control device 15.

According to the plasticizing device 100b of the present embodiment described above, since water vapor in the housing unit 400 can be discharged through the exhaust passage 33, the humidity in the housing unit 400 can be reduced. Therefore, it is possible to effectively prevent the occurrence of the dew condensation in the housing unit 400. In the present embodiment, an inner wall surface of the material inlet 413 of the housing unit 400 may be formed of a heat insulating member having a lower thermal conductivity than that of the main body portion 410. In this case, it is possible to prevent water vapor flowing from between the flat screw 111 and the barrel 112 to the exhaust passage 33 from being cooled at the material inlet 413 to cause dew condensation.

Further, in the present embodiment, since the second heater 35 for heating the exhaust passage 33 is provided, it is possible to prevent the occurrence of dew condensation due to cooling of the water vapor in the exhaust passage 33.

C. Third Embodiment

Figure 10:
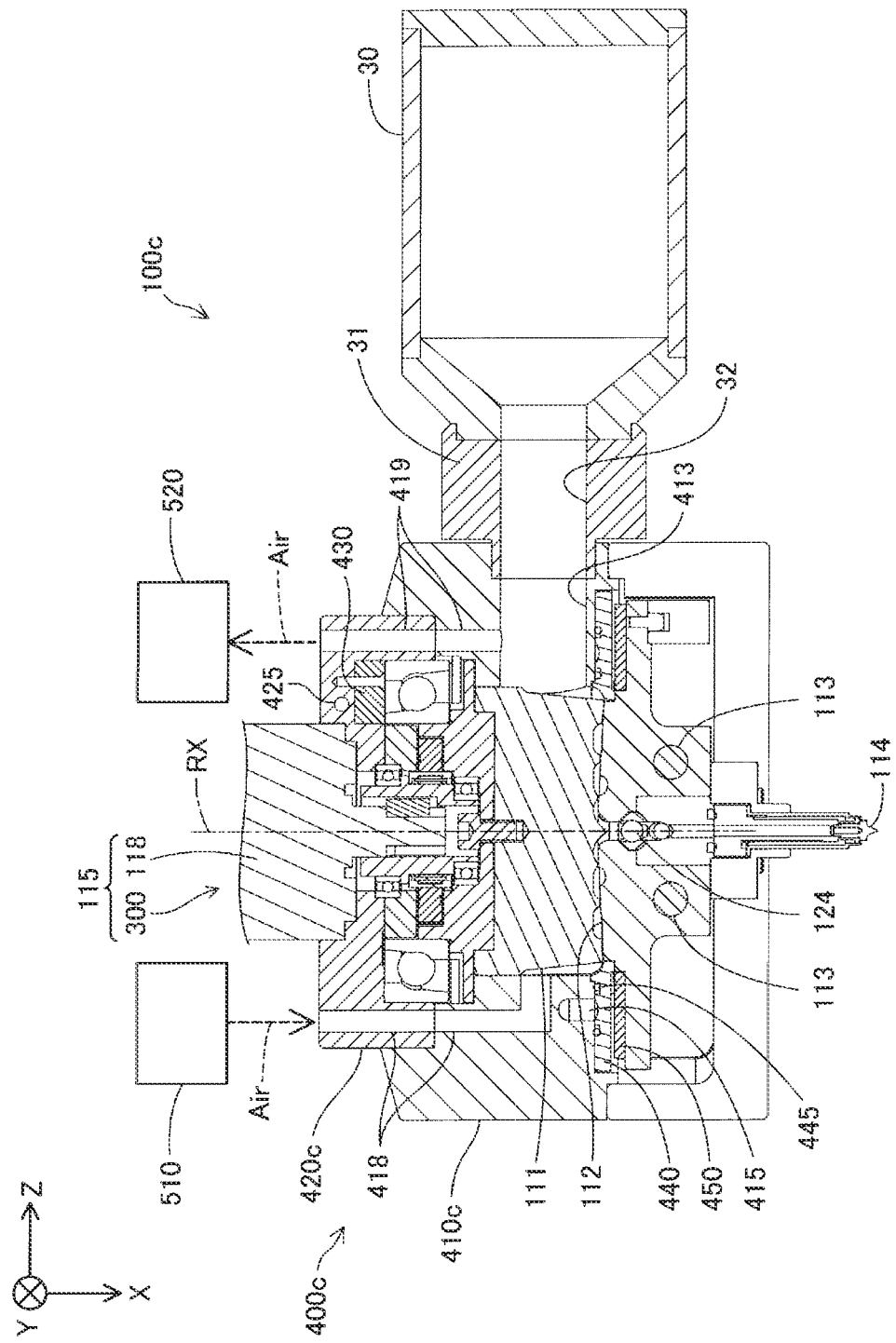
FIG. 10 is a cross-sectional view showing a schematic configuration of a plasticizing device according to a third embodiment.

FIG. 10 is a cross-sectional view showing a schematic configuration of a plasticizing device 100c according to a third embodiment. The third embodiment is different from the first embodiment in that the plasticizing device 100c is provided with a blower 510 and a suction unit 520. Other configurations are the same as those of the first embodiment unless otherwise specified.

In the present embodiment, a housing unit 400c includes an air supply passage 418 and an exhaust passage 419. The air supply passage 418 and the exhaust passage 419 communicates the outside of the housing unit 400c with a space inside the housing unit 400c in which the flat screw 111 is housed. The air supply passage 418 and the exhaust passage 419 are formed by through holes provided in a lid portion 420c and a main body portion 410c. An opening portion of the air supply passage 418 communicating with the outside of the housing unit 400c is provided in a portion of the lid portion 420c on the −Z direction side with respect to the rotation axis RX of the flat screw 111. An opening portion of the air supply passage 418 communicating with the inside of the housing unit 400c is provided in a portion of the main body portion 410c on the −Z direction side with respect to the rotation axis RX. An opening portion of the exhaust passage 419 communicating with the inside of the housing unit 400c is provided in a portion of the main body portion 410c on the +Z direction side with respect to the rotation axis RX. An opening portion of the exhaust passage 419 communicating with the outside of the housing unit 400c is provided in a portion of the lid portion 420c on the +Z direction side with respect to the rotation axis RX.

The above-described blower 510 is coupled to the opening portion on the outside of the air supply passage 418 via a pipe. The blower 510 supplies air taken in from the atmosphere to the air supply passage 418. The blower 510 is, for example, a centrifugal blower driven under the control of the control device 15. The blower 510 is not limited to a centrifugal blower, and may be an axial blower or a diagonal blower. The blower 510 may supply, for example, an inert gas such as argon instead of air to the air supply passage 418.

The suction unit 520 described above is coupled to the opening portion on the outside of the exhaust passage 419 via a pipe. The suction unit 520 sucks air from the exhaust passage 419 and discharges the air to the atmosphere. The suction unit 520 is, for example, a vacuum pump driven under the control of the control device 15.

According to the plasticizing device 100c of the present embodiment described above, since the air in the atmosphere can be supplied by the blower 510 into the housing unit 400c in which the humidity is likely to be higher than that of the atmosphere due to the water vapor generated when the material is plasticized, the humidity in the housing unit 400c can be reduced. Therefore, it is possible to effectively prevent the occurrence of dew condensation in the housing unit 400c.

Further, in the present embodiment, since the air in the housing unit 400c can be sucked by the suction unit 520, an amount of the water vapor in the housing unit 400c can be reduced. Therefore, it is possible to more effectively prevent the occurrence of the dew condensation in the housing unit 400c.

In the plasticizing device 100c of the third embodiment, as in the second embodiment, the exhaust passage 33 branched from the material passage 32 may be provided. Further, the second heater 35 for heating the exhaust passage 33 may be provided.

D. Fourth Embodiment

Figure 11:
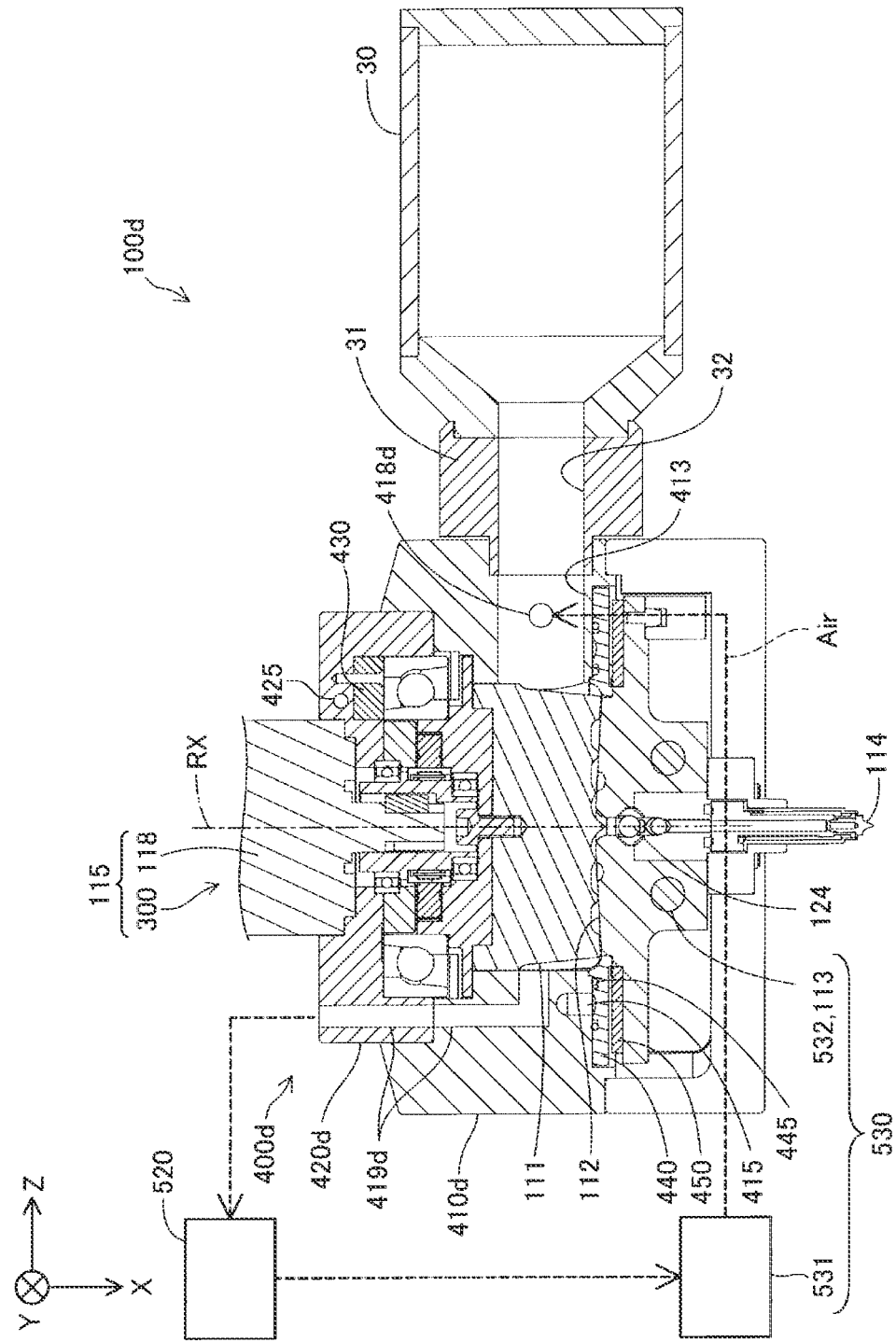
FIG. 11 is a cross-sectional view showing a schematic configuration of a plasticizing device according to a fourth embodiment.
Figure 12:
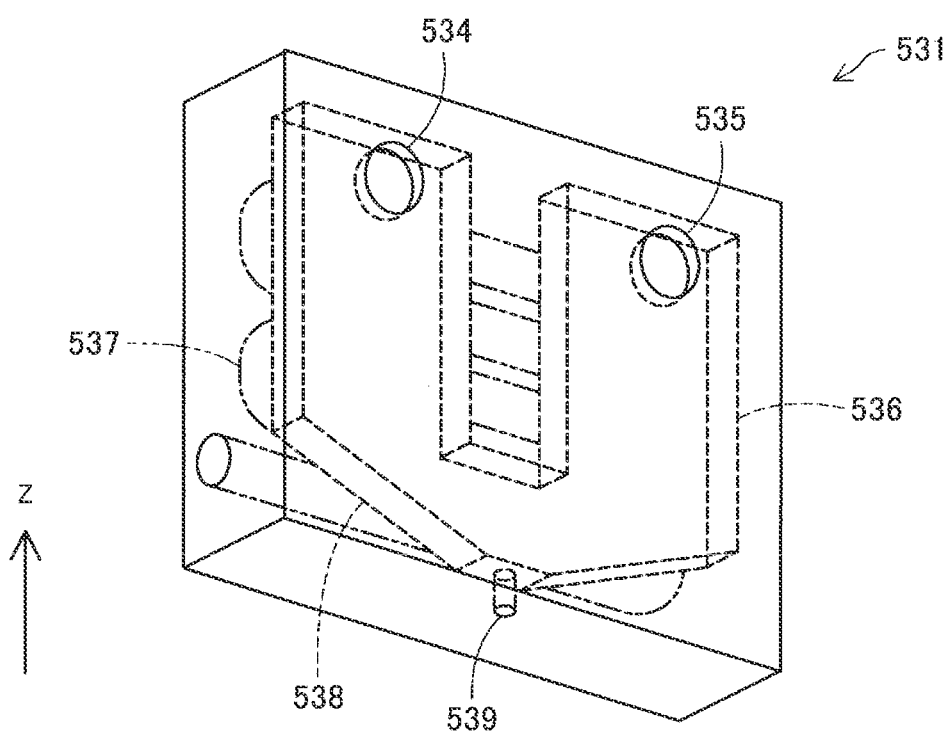
FIG. 12 is a perspective view showing a configuration of a third cooling unit provided in a drying unit.

FIG. 11 is a cross-sectional view showing a schematic configuration of a plasticizing device 100d according to a fourth embodiment. FIG. 12 is a perspective view showing a configuration of a third cooling unit 531 included in a drying unit 530. As shown in FIG. 11, the plasticizing device 100d of the fourth embodiment is different from that of the first embodiment in that the suction unit 520 and the drying unit 530 are provided. Other configurations are the same as those of the first embodiment unless otherwise specified.

In the present embodiment, a housing unit 400d includes an air supply passage 418d and an exhaust passage 419d. The air supply passage 418d and the exhaust passage 419d communicates the outside of the housing unit 400d with a space inside the housing unit 400d in which the flat screw 111 is housed. An opening portion of the air supply passage 418d communicating with the inside of the housing unit 400d is provided on the inner wall surface of the material inlet 413 disposed on the +Z direction side with respect to the rotation axis RX of the flat screw 111 in a main body portion 410d. An opening portion of the exhaust passage 419d communicating with the inside of the housing unit 400d is provided in a portion of the main body portion 410d on the −Z direction side with respect to the rotation axis RX. An opening portion of the exhaust passage 419d communicating with the outside of the housing unit 400d is provided in a portion of a lid portion 420d on the −Z direction side with respect to the rotation axis RX.

The suction unit 520 described above is coupled to the opening portion on the outside of the exhaust passage 419d via a pipe. The suction unit 520 sucks air from the exhaust passage 419d. The suction unit 520 is, for example, a vacuum pump driven under the control of the control device 15.

The drying unit 530 described above is coupled to the suction unit 520 via a pipe. In the present embodiment, the drying unit 530 includes the third cooling unit 531 that cools the air and a third heater 532 that heats the air cooled by the third cooling unit 531.

As shown in FIG. 12, the third cooling unit 531 includes an inlet 534, an outlet 535, and a gas passage 536 that communicates the inlet 534 with the outlet 535. The inlet 534 is coupled to the suction unit 520 via a pipe, and the outlet 535 is coupled to the third heater 532 via a pipe. A refrigerant pipe 537 through which the refrigerant flows is provided in the third cooling unit 531 so as to be adjacent to the gas passage 536. A drain hole 539 is provided in a bottom surface 538 of the gas passage 536. The bottom surface 538 is inclined such that water droplets gather in the drain hole 539. The water vapor contained in the air flowing through the gas passage 536 is cooled by the refrigerant flowing through the refrigerant pipe 537 to become water droplets, and is discharged from the drain hole 539.

As shown in FIG. 11, in the present embodiment, a pipe coupling the third cooling unit 531 and the air supply passage 418d is provided along a surface of the barrel 112 on the +X direction side, and thus the third heater 532 is configured. That is, in the present embodiment, the third heater 532 is the first heater 113. The third heater 532 may be provided separately from the first heater 113. The air sucked from the inside of the housing unit 400d by the suction unit 520 circulates into the housing unit 400d from the air supply passage 418d after passing through the drying unit 530. In the drying unit 530, after the air is cooled by the third cooling unit 531, a temperature of the air is increased by the third heaters 532 and 113.

According to the plasticizing device 100d of the present embodiment described above, since the air dried by the drying unit 530 is supplied into the housing unit 400d, it is possible to reduce the humidity in the housing unit 400d even when humidity of an installation place of the injection molding device 10 is relatively high. Therefore, it is possible to effectively prevent the occurrence of dew condensation in the housing unit 400d.

Further, in the present embodiment, since the drying unit 530 includes the third cooling unit 531 that cools the air and the third heaters 532 and 113 that heat the air, an amount of water vapor in the air can be reduced by cooling of the third cooling unit, and then a temperature of the air can be increased by heating of the third heaters 532 and 113. Therefore, it is possible to prevent the occurrence of dew condensation in the housing unit 400d due to the supply of low-temperature air into the housing unit 400d.

Further, in the present embodiment, since the air in the housing unit 400d is circulated in the housing unit 400d after being dried in the drying unit 530 without being discharged to the atmosphere, it is possible to prevent the odor of the gas generated during plasticizing of the material from flowing out of the plasticizing device 100d.

In the plasticizing device 100d of the fourth embodiment, as in the second embodiment, the exhaust passage 33 branched from the material passage 32 may be provided. Further, the second heater 35 for heating the exhaust passage 33 may be provided.

E. Fifth Embodiment

Figure 13:
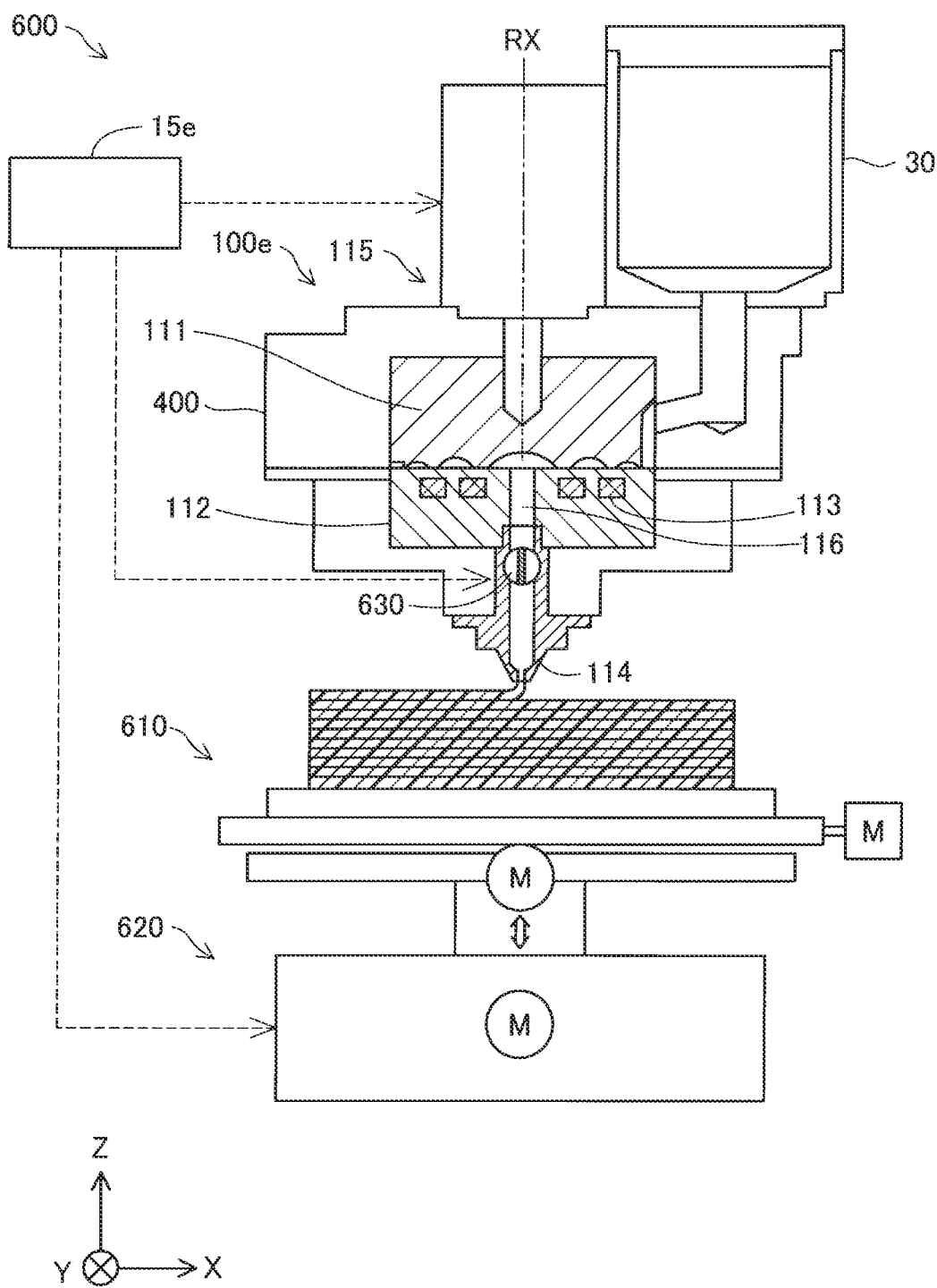
FIG. 13 is a cross-sectional view showing a schematic configuration of a three-dimensional shaping device according to a fifth embodiment.

FIG. 13 is a cross-sectional view showing a schematic configuration of a three-dimensional shaping device 600 according to a fifth embodiment. The three-dimensional shaping device 600 includes a plasticizing device 100e, a shaping stage 610, a moving mechanism 620, and a control device 15e.

The plasticizing device 100e includes the flat screw 111, the barrel 112, and the first heater 113. The nozzle 114 is coupled to the plasticizing device 100e. A configuration of the plasticizing device 100e is the same as that of the plasticizing device 100 in the first embodiment. In the present embodiment, a valve 630, which switches a discharge amount of the plasticized material from the nozzle 114 or whether the plasticizing material is discharged, is provided between the communication hole 116 and the nozzle 114. The valve 630 is driven under control of the control device 15e.

An upper surface of the shaping stage 610 faces the nozzle 114. A three-dimensional shaped object is shaped on the shaping stage 610. In the present embodiment, the shaping stage 610 is disposed along a horizontal direction. The shaping stage 610 is supported by the moving mechanism 620.

The moving mechanism 620 changes a relative position between the nozzle 114 and the shaping stage 610. In the present embodiment, the moving mechanism 620 changes the relative position between the nozzle 114 and the shaping stage 610 by moving the shaping stage 610. The moving mechanism 620 in the present embodiment is configured with a three-axis positioner that moves the shaping stage 610 in three axial directions of the X, Y, and Z directions by power generated by three motors. Each motor is driven under the control of the control device 15e. The moving mechanism 620 may be configured to change the relative position between the nozzle 114 and the shaping stage 610 by moving the plasticizing device 100e without moving the shaping stage 610. Further, the moving mechanism 620 may be configured to change the relative position between the nozzle 114 and the shaping stage 610 by moving both the shaping stage 610 and the plasticizing device 100e.

Under the control of the control device 15e, the three-dimensional shaping device 600 discharges the plasticized material from the nozzle 114 while changing the relative position between the nozzle 114 and the shaping stage 610, thereby laminating a layer of the plasticized material on the shaping stage 610 to shape a three-dimensional shaped object having a desired shape.

In the three-dimensional shaping device 600 according to the fifth embodiment described above, since the same plasticizing device as that of the first embodiment is provided as the plasticizing device 100e, it is possible to prevent the occurrence of dew condensation in the housing unit 400 of the plasticizing device 100e. The plasticizing device 100e is not limited to the same plasticizing device as in the first embodiment, and may be the same plasticizing device as in the second embodiment, the third embodiment, or the fourth embodiment.

F. Other Embodiments (F1) In the plasticizing devices 100 to 100e of the above-described embodiments, the housing units 400 to 400d may not include the second cooling unit 415 and the second heat insulating unit 450.

(F2) In the plasticizing device 100b of the second embodiment described above, a pump for sucking water vapor from the exhaust passage 33 may be provided. In this case, the water vapor can be effectively discharged from the exhaust passage 33.

(F3) In the plasticizing device 100b of the second embodiment described above, the second heater 35 may not be provided. In this case, the inner wall surfaces of the material passage 32 and the exhaust passage 33 may be formed of a heat insulating member having a thermal conductivity lower than the thermal conductivity of the coupling member 31.

(F4) In the plasticizing device 100c of the third embodiment described above, the blower 510 may not be provided. Even in this case, air can be introduced from the air supply passage 418 by sucking air from the exhaust passage 419 by the suction unit 520.

(F5) In the plasticizing device 100c of the third embodiment described above, the suction unit 520 may not be provided. Even in this case, the air containing the water vapor can be pushed out from the exhaust passage 419 by supplying the air from the air supply passage 418 by the blower 510.

(F6) In the plasticizing devices 100 to 100e of the respective embodiments described above, a temperature sensor that measures the temperature in the housing units 400 to 400d or a humidity sensor that measures the humidity in the housing units 400 to 400d may be provided. When the temperature measured by the temperature sensor is lower than a predetermined temperature, or when the humidity measured by the humidity sensor is higher than a predetermined humidity, that is, in a situation in which dew condensation is likely to occur, the control devices 15 and 15e may increase the temperature of the first heater 113. In this case, since the temperature in the housing units 400 to 400d increases and a saturated water vapor amount increases, dew condensation is less likely to occur. Further, in a situation in which dew condensation is likely to occur, the control devices 15 and 15e may lengthen a molding cycle of the molded product. In this case, since the amount of the water vapor generated per unit time in the housing units 400 to 400d can be made smaller than the amount of the water vapor discharged per unit time from the housing units 400 to 400d through gaps between the members or the like, the amount of the water vapor in the housing units 400 to 400d can be reduced.

(F7) In the plasticizing device 100d of the fourth embodiment described above, the drying unit 530 reduces the humidity of the air by cooling the air by the third cooling unit 531. On the other hand, the drying unit 530 may be configured to reduce the humidity of the air by compressing the air, may be configured to reduce the humidity of the air by bringing the air into contact with a solid that easily adsorbs moisture, or may be configured to reduce the humidity of the air by bringing the air into contact with a liquid that easily absorbs moisture.

(F8) In the plasticizing devices 100 to 100e of the respective embodiments described above, the first cooling unit 425 that cools the drive motor 118 is formed by pipes through which the refrigerant flows, which are embedded in the lid portions 420 to 420d of the housing units 400 to 400d. On the other hand, the first cooling unit 425 may be provided outside the housing units 400 to 400d. For example, the first cooling unit 425 may be formed by pipes through which the refrigerant flows, which are disposed on the surfaces of the lid portions 420 to 420d on the −X direction side.

G. Other Aspects

The present disclosure is not limited to the embodiments described above, and can be implemented in various forms without departing from the scope of the present disclosure. For example, the present disclosure can be implemented in the following aspects. In order to solve a part of or all of problems of the present disclosure, or to achieve a part of or all of effects of the present disclosure, technical features in the above-described embodiments corresponding to technical features in the following aspects can be replaced or combined as appropriate. Further, when the technical features are not described as essential in the present description, the technical features can be appropriately deleted.

(1) According to a first aspect of the present disclosure, a plasticizing device that plasticizes at least a part of a material to generate a plasticized material is provided. The plasticizing device includes: a drive motor; a screw configured to rotate around a rotation axis by a drive force of the drive motor and having a groove forming surface in which a groove is formed; a speed reducer disposed between the drive motor and the screw and configured to transmit the drive force of the drive motor to the screw; a barrel having a facing surface facing the groove forming surface and having a through hole into which the plasticized material flows; a first heater configured to heat the material supplied between the screw and the barrel; a first cooling unit configured to cool the drive motor; and a heat insulating unit disposed between the first cooling unit and the speed reducer. At least a part of the heat insulating unit overlaps the first cooling unit when viewed along the rotation axis of the screw.

According to the plasticizing device of this aspect, since the heat insulating unit is disposed between the first cooling unit and the speed reducer, it is possible to reduce a temperature gradient between the first heater and the heat insulating unit. Therefore, it is possible to prevent the occurrence of dew condensation in the plasticizing device.

(2) In the plasticizing device according to the above aspect, the heat insulating unit may be provided along a shape of the first cooling unit when viewed along the rotation axis of the screw.

According to the plasticizing device of this aspect, since the first cooling unit can be covered with the heat insulating unit, the temperature gradient between the first heater and the heat insulating unit can be effectively reduced.

(3) The plasticizing device of the above aspect may further include a second cooling unit disposed on an outer periphery of the screw.

According to the plasticizing device of this aspect, since a temperature of an outer peripheral portion of the screw can be kept lower than a temperature of a central portion of the screw by the second cooling unit, it is possible to prevent the material from being hardly conveyed between the screw and the barrel. Therefore, it is possible to prevent variation in the amount of the plasticized material flowing into the through hole.

(4) The plasticizing device of the above aspect may include: a material passage for supplying the material between the screw and the barrel; and an exhaust passage branched from the material passage.

According to the plasticizing device of this aspect, since the water vapor in the housing unit can be discharged from the exhaust passage, the occurrence of dew condensation in the housing unit can be effectively prevented.

(5) The plasticizing device according to the above aspect may further include a second heater configured to heat the exhaust passage.

According to the plasticizing device of this aspect, since a temperature of the exhaust passage can be increased by the second heater, the occurrence of dew condensation in the exhaust passage can be prevented.

(6) The plasticizing device according to the above aspect may include: a housing unit in which the screw is housed; and a blower configured to supply a gas into the housing unit.

According to the plasticizing device of this aspect, the relative humidity of the gas in the housing unit can be reduced by supplying the gas into the housing unit. Therefore, it is possible to effectively prevent the occurrence of dew condensation in the housing unit.

(7) The plasticizing device according to the above aspect may include: a housing unit in which the screw is housed; and a suction unit configured to suck a gas in the housing unit.

According to the plasticizing device of this aspect, since the gas containing water vapor in the housing unit can be sucked by the suction unit, an amount of the water vapor in the housing unit can be reduced. Therefore, it is possible to effectively prevent the occurrence of dew condensation in the housing unit.

(8) The plasticizing device according to the above aspect may further include a drying unit configured to dry a gas to be supplied into the housing unit.

According to the plasticizing device of this aspect, since the gas dried by the drying unit can be supplied into the housing unit, it is possible to effectively reduce the relative humidity of the gas in the housing unit.

(9) In the plasticizing device according to the above aspect, the drying unit may include a third cooling unit configured to cool a gas to be supplied into the housing unit, and a third heater configured to heat the gas cooled by the third cooling unit.

According to the plasticizing device of this aspect, it is possible to reduce the relative humidity of the gas by aggregating the moisture in the gas by the third cooling unit. Further, since a temperature of the gas reduced by the cooling of the third cooling unit can be increased by the third heater, it is possible to prevent the occurrence of dew condensation in the housing unit due to the supply of the low-temperature gas into the housing unit.

(10) In the plasticizing device of the above aspect, the third heater may be the first heater.

According to the plasticizing device of this aspect, since the temperature of the gas cooled by the third cooling unit can be increased by the first heater that plasticizes the material, power consumption can be reduced.

(11) According to a second aspect of the present disclosure, an injection molding device is provided. The injection molding device includes: the plasticizing device according to the above aspect; and a nozzle through which the plasticized material flowing out of the through hole is injected into a molding mold.

According to the injection molding device of this aspect, it is possible to prevent the occurrence of dew condensation in the plasticizing device.

(12) According to a third aspect of the present disclosure, a three-dimensional shaping device is provided. The three-dimensional shaping device includes: the plasticizing device according to the above aspect; and a nozzle through which the plasticized material flowing out of the through hole is discharged toward a stage.

According to the three-dimensional shaping device of this aspect, it is possible to prevent the occurrence of dew condensation in the plasticizing device.

The present disclosure may be implemented in various aspects other than the plasticizing device. For example, the present disclosure can be implemented in the aspect of an injection molding device, a three-dimensional shaping device, or the like.

What is claimed is:

1. A plasticizing device that plasticizes at least a part of a material to generate a plasticized material, the plasticizing device comprising:
   a drive motor;
   a screw configured to rotate around a rotation axis by a drive force of the drive motor and having a groove forming surface in which a groove is formed;
   a speed reducer disposed between the drive motor and the screw and configured to transmit the drive force of the drive motor to the screw;
   a barrel having a facing surface facing the groove forming surface and having a through hole into which the plasticized material flows;
   a first heater configured to heat the material supplied between the screw and the barrel;
   a first cooling unit configured to cool the drive motor; and
   a heat insulating unit disposed between the first cooling unit and the speed reducer, wherein
   at least a part of the heat insulating unit overlaps the first cooling unit when viewed along the rotation axis of the screw.

2. The plasticizing device according to claim 1, wherein the heat insulating unit is provided along a shape of the first cooling unit when viewed along the rotation axis of the screw.

3. The plasticizing device according to claim 1, further comprising:
   a second cooling unit disposed on an outer periphery of the screw.

4. The plasticizing device according to claim 1, further comprising:
   a material passage for supplying the material between the screw and the barrel; and
   an exhaust passage branched from the material passage.

5. The plasticizing device according to claim 4, further comprising:
   a second heater configured to heat the exhaust passage.

6. The plasticizing device according to claim 1, further comprising:
   a housing unit in which the screw is housed; and
   a blower configured to supply a gas into the housing unit.

7. The plasticizing device according to claim 1, further comprising:
   a housing unit in which the screw is housed; and
   a suction unit configured to suck a gas in the housing unit.

8. The plasticizing device according to claim 6, further comprising:
   a drying unit configured to dry a gas to be supplied into the housing unit.

9. The plasticizing device according to claim 8, wherein the drying unit includes a third cooling unit configured to cool a gas to be supplied into the housing unit, and a third heater configured to heat the gas cooled by the third cooling unit.

10. The plasticizing device according to claim 9, wherein, the third heater is the first heater.

11. An injection molding device, comprising:
    the plasticizing device according to claim 1; and
    a nozzle through which the plasticized material flowing out of the through hole is injected into a molding mold.

12. A three-dimensional shaping device, comprising:
    the plasticizing device according to claim 1; and
    a nozzle through which the plasticized material flowing out of the through hole is discharged toward a stage.

* * * * *